United States Patent
Egawa et al.

[19]

[11] Patent Number: 6,075,681
[45] Date of Patent: Jun. 13, 2000

[54] MAGNETIC HEAD ASSEMBLY HAVING SYMMETRICALLY POSITIONED SHIELD RINGS

[75] Inventors: Motoji Egawa; Kazutoshi Takayanagi, both of Asaba-Cho, Japan

[73] Assignee: Minebea Co., Ltd., Kitasaku, Japan

[21] Appl. No.: 08/855,558

[22] Filed: Jun. 4, 1997

[30] Foreign Application Priority Data

Oct. 18, 1996 [JP] Japan ................................ 8-297668

[51] Int. Cl.$^7$ ................................................ G11B 5/105
[52] U.S. Cl. ........................................ 360/128; 360/125
[58] Field of Search ........................ 360/103, 105–106, 360/125, 128, 126, 119, 122

[56] References Cited

U.S. PATENT DOCUMENTS

| | | | |
|---|---|---|---|
| 5,166,846 | 11/1992 | Shigemoto | 360/103 |
| 5,235,483 | 8/1993 | Hayakawa et al. | 360/103 |
| 5,296,980 | 3/1994 | Matsui et al. | 360/97.01 |
| 5,311,378 | 5/1994 | Williams et al. | 360/103 |
| 5,377,060 | 12/1994 | Nigam | 360/99.01 |
| 5,402,397 | 3/1995 | Ohmori et al. | 360/114 |
| 5,485,336 | 1/1996 | Matsunaga | 360/103 |
| 5,497,283 | 3/1996 | Kato | 360/121 |
| 5,682,280 | 10/1997 | Takahashi et al. | 360/105 |

*Primary Examiner*—Brian E. Miller
*Attorney, Agent, or Firm*—Oliff & Berridge, PLC

[57] ABSTRACT

A magnetic head assembly 1E is constituted in such a manner as a pair of magnetic head mechanisms 3E, 3E, which are formed by accommodating a magnetic head 5 in a shield ring, respectively, are disposed opposite by opposing the proximal end rail 15a and the distal end rail 15b of one magnetic head mechanism 3E to the distal end rail 15b and the proximal end rail 15a of the other magnetic head mechanism 3E, respectively. A pair of shield rings 6,6 are positioned symmetrically with respect to each other (not in off-set). A spacing $L_s$ of a pair of shield rings is shorter than a spacing $L_c$ between the one shield ring 6 and the other magnetic head core 8. The outer magnetic flux φ flows to each other shield ring 6, so that the flux $φ_c$ which flows to the magnetic head core 8 reduces. Thus, the induced voltage in the coil generated by any outer magnetic field is controlled to reduce noise.

4 Claims, 6 Drawing Sheets

MAGNETIC HEAD ASSEMBLY HAVING SYMMETRICALLY POSITIONED SHIELD RINGS

FIELD OF THE INVENTION

The present invention relates to a magnetic head apparatus for use of floppy disc drive.

DESCRIPTION OF THE CONVENTIONAL ART

In FIGS. 8–14, a magnetic head assembly 1 is shown as a conventional example which uses for a floppy disc drive. In FIG. 13, on both surfaces (hereinafter referred to "upper surface or below surface" correspondingly to drawings for convenience) 2a and 2b of a magnetic recording medium 2, a recording surface is provided, respectively, and corresponding to two recording surfaces of upper and below, across the magnetic recording medium 2 two magnetic head mechanisms 3,3 are provided oppositely.

The magnetic head mechanism 3 comprises, as shown in FIGS. 10–12, a base plate 4, a magnetic head 5 provided on the base plate 4 for reading and writing a signal on an upper surface 2a (of below surface 2b) and a shield ring 6 disposed so as to surround the head 5 to prevent from being affected an external magnetic field.

The magnetic head 5 comprises a magnetic head base stand 7 and a magnetic head core 8, and as shown in FIG. 9, two coils 9,9 (hereinafter referred to appropriately as "a read/write coil 9a and an erase coil 9b") and coil supports 10,10 for supporting the read/write coil 9a and erase coil 9b, respectively (hereinafter referred to as "read/write coil support 10a and erase coil support 10b").

The magnetic head stand 7 is composed of, as shown in FIG. 10, a plate-like stand portion 11 provided on the base plate 4, a plate-like sliding portion 12 disposed opposite to the stand portion 11 to slide on a magnetic recording medium 2, and a connecting portion 13 to connect between the proximal ends of the stand portion 11 and the sliding portion 12, and viewing from the side, it looks like U-letter configuration. At the central portion of the sliding portion 12, a groove 14 (escaping groove) extends in the running direction of the magnetic medium 2. By providing this groove 14, both end sides of the sliding portion 12 are projected relative to the groove 14 to form rails 15,15 (hereinafter referred to appropriately as "proximal side rail 15a and distal side rail 15b), so that the contact to the magnetic recording medium 2 is improved and a spacing loss is reduced. Through the distal side rail 15b and the stand portion 11, the magnetic head core 8 is inserted in parallel to the groove 14.

The magnetic head core 8 is formed, as shown in FIG. 9, in which two core assemblies 16,16 having similar shape. The core assembly 16 is formed with a L-core 17, one end of which is made as a leg portion 17a, and an I-core 18 which is in contact with the leg portion 17a, by which a U-letter shape is configured, and a central core 19 having I-letter shape by being in contact with the L-core 17 and the I-core 18 to form a closed magnetic path like a square loop. This central core 19 is used in common with two core assemblies 16,16.

The core assembly 16 is supported, as shown in FIG. 10, on the magnetic head base stand 7, at which the I-core 18 is disposed to the side of the base stand 4. Further, as shown in FIG. 9, in the L-core 17, the side portion opposing the I-core 18 is opposing to the magnetic recording medium 2, (the upper side portion of the L-core 17 shown in FIG. 9) and, in the one core assembly 16, at the connecting portion between the L-core 17 and the central I-core 19, a read/write gap 20 is provided and, in the other core assembly 16, at the connecting portion between the L-core 17 and the central I-core 19, an erase gap 21 is formed to make a guard band.

As shown in FIG. 9, the coil support 10 (read/write coil support 10a, erase coil support 10b) is formed with a longitudinal support body 22 fixed to the base plate 4 and a bobbin 23 connected to the support body 22, wherein the bobbin 23 is coupled with the leg portion 17a of the core assembly 16 and the coil 9 is coupled with the bobbin 23. In the coils 9,9, what is coupled with each bobbin 23 of the read/write coil support 10a and the erase coil support 10b are a read/write coil 9a and an erase coil 9b, respectively. The read/write coil 9a is wound at 200–300 turns for amplifying a reading signal, the erase coil is wound at about 200 turns for decreasing an erase signal, so that, as shown in FIG. 8, both outer periphery sides thereof are projected from the distal end side rail 15b.

And, a floppy disc drive is used in an embedded manner in the device such as a personal computer, so that a magnetic head core 8 has been apt to be interfered with some external magnetic field generated from a switching source or a CRT or the like to occur a reading error, however, in order to prevent from occurring a reading error at the magnetic head, a shield ring 6 is provided. This shield ring 6 is formed with a magnetic material such as ferrite or permalloy and disposed around the periphery of the magnetic head 5.

The shield ring 6 is formed with, as shown in FIGS. 8, 11 and 12, a ring body 24 having a rectangular loop ring shape, and two rectangular wall plates 25,25 connecting with side portions 24a,24b of the ring body (an upper and a lower side portions shown in FIG. 8), which are faced with each other, and the bottom of which are bonded to the base stand 4. The magnetic head 5 is accommodated in the shield ring 6, wherein the connecting portion 13 of the magnetic head base stand 7 is disposed at the lower side 24b and the coil 9 is disposed at the upper side 24a. In this case, considering the following effect that the more the shield ring is small, the more a shielding effect is excellent and the more the material for forming the shield ring is reduced, the connecting portion 13 of the magnetic head base stand 7 is disposed close to the lower side 24b (i.e., reducing the space between the connecting portion 13 and the lower side 24b) as much as possible. So that, a distance A between the upper side 24a and the center C of the groove 14 is greater (A>B) than the distance B between the lower side 24b and the center C of the groove 14. And, a length m between the shield ring 6 and the base stand 4 is, as shown in FIG. 12, set shorter than a length n (m<n) which is determined between the sliding surface of the rails 15,15 (the proximal end rail 15a, the distal end rail 15b) with the magnetic recording medium 2 and the base stand 4 to avoid coming contact with the magnetic recording medium 2.

And, the magnetic head assembly 1 is constituted in such a manner as a pair of magnetic head mechanisms 3,3, as shown in FIG. 13, sandwich the magnetic recording medium 2 therebetween. In this case, a pair of magnetic head mechanisms 3,3 are arranged in such a manner as the proximal end side rail 15a and the distal end side rail 15b of one magnetic head mechanism 3 are opposite respectively to the other distal end side rail 15b and the proximal end side rail 15a of the other magnetic head mechanism 3 to avoid an magnetic interference between a pair of magnetic heads 5,5.

In the above magnetic head assembly 1, however, the problem resides in that, since, in a pair of magnetic head mechanisms 3,3, as shown in FIG. 8, a distance A between the upper side 24a of the shield ring 6 and the center C of the groove 14 is set greater (A>B) than the distance B between the lower side 24b and the center C of the groove 14, as shown in FIG. 13, a pair of magnetic head mechanisms 3,3 are arranged in such a manner as the proximal end side rail 15a and the distal end side rail 15b of one magnetic head mechanism 3 are opposing respectively to the distal end side rail 15b and the proximal end side rail 15a of the other magnetic head mechanism 3, so that a pair of shield rings 6, as shown in FIGS. 13 and 14, are not properly opposed at upper and lower portions, respectively, i.e., these are in an off-set position.

So that, as shown in FIG. 14, a magnetic inducted flux $\phi$ inducted from outside by one (positioning at lower side in FIG. 14) shield ring 6 flows into not only the other (positioning upper side in FIG. 14) shield ring 6 but also into the other (upper side) magnetic head core 8, and then, the flux $\phi$ is separated into a flux $\phi_s$ to be induced in the other (upper side) shield ring 6 and a flux $\phi_c$ to be induced in the other (upper side) magnetic head core 8, and transmitted to the other (upper side) magnetic head 5. Of the fluxes, the flux $\phi_c$ induced in the other (upper) magnetic core 8 generates an induction current at the read/write coil 9a wound on the leg portion 17a of the magnetic core 8, which causes a noise to be occurred.

And, the ratio of the flux $\phi_s$ induced in the other shield ring 6 and the flux $\phi_c$ induced in the other magnetic head core 8 have a corresponding relation to the ratio of the spacing $L_s$ between the one shield ring 6 and the other shield ring 6 and the spacing $L_c$ between the one shield ring 6 and the other magnetic head core 8. Further, in order to avoid coming in contact with the magnetic recording medium 2, the length of the shield ring 6 is, as shown in FIG. 12, set shorter (m<n) than the distance between the sliding surface of the rail (proximal end rail 15a and distal end rail 15b) with the magnetic recording medium 2 and the base stand 4. Therefore, in the above apparatus, as shown in FIG. 14, as to the spacing $L_s$ and $L_c$, the relation becomes $L_s > L_c$, which causes the flux $\phi_c$ induced in the other magnetic head core 8 becomes relatively larger than the flux $\phi_s$ induced in the the other shield ring 6, thereby the noise generated in the read/write coil 9a becomes larger.

The present invention has been made in the light of the above circumstances, and the purpose of it is to provide a magnetic head assembly which can reduce the interference from external magnetic head.

According to the invention, a magnetic head assembly which comprises a pair of magnetic heads disposed on both sides of a magnetic recording medium and shield rings disposed in such a manner as surrounding the magnetic heads, respectively, and by which an external magnetic field is less affected to the both magnetic hand, wherein the improvement resides in that the shield rings are disposed in such a manner as those are opposite completely, in which a magnetic recording medium is interposed.

According to the invention, the spacing between both shield rings maybe set shorter than the spacing between the one shield ring and the other magnetic head core.

EMBODIMENT

Hereinafter, based on FIGS. 1–7, one embodiment of a magnetic head assembly 1E of the present invention is explained. Now, any equivalent members and parts recited in FIGS. 8–14 are appropriately omitted in drawings and explaining.

Figure 1:
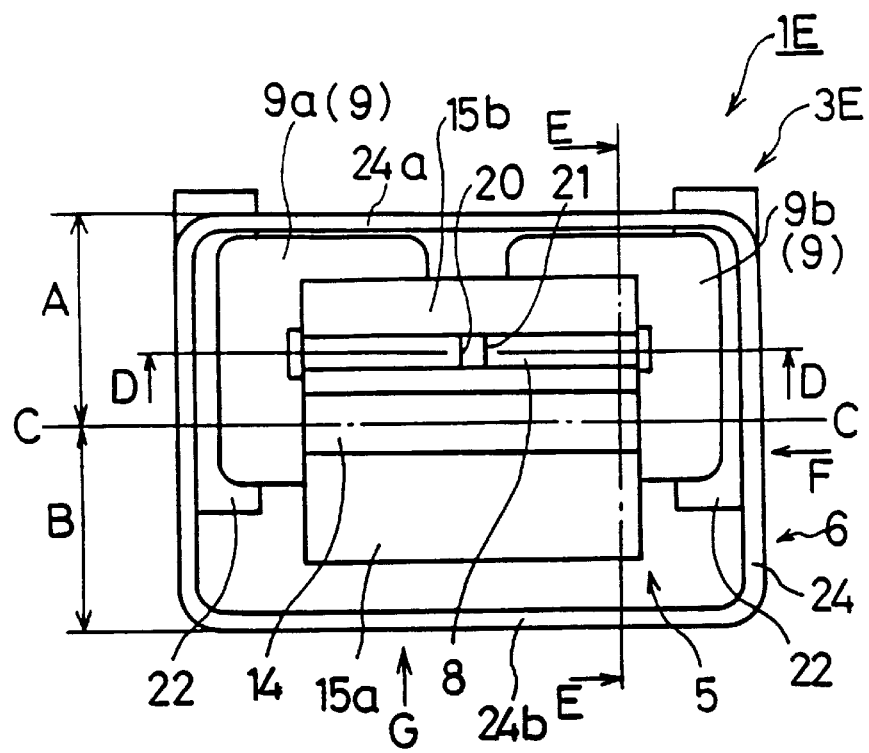
FIG. 1 is a plan view showing one of the embodiment of the present invention, in which one magnetic head and one shield ring of a magnetic head assembly are shown.
Figure 2:
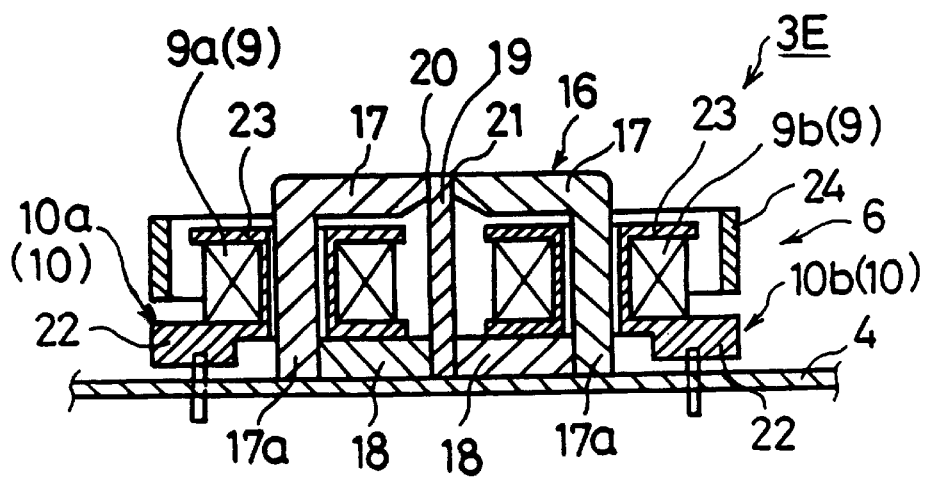
FIG. 2 is a sectional view along arrow D—D of FIG. 1.
Figure 3:
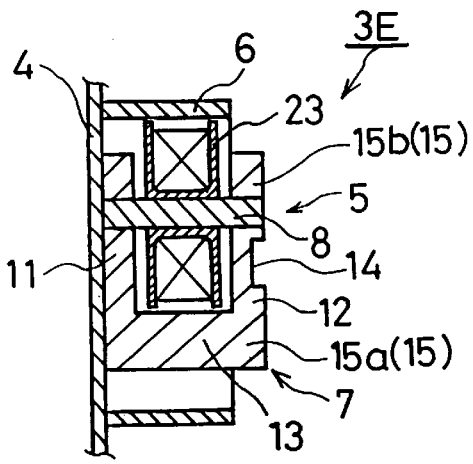
FIG. 3 is a sectional view along arrow E—E of FIG. 1.
Figure 4:
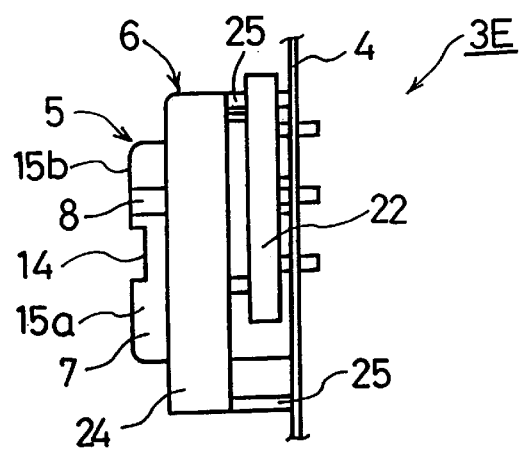
FIG. 4 is a perspective view along arrow F of FIG. 1.
Figure 5:
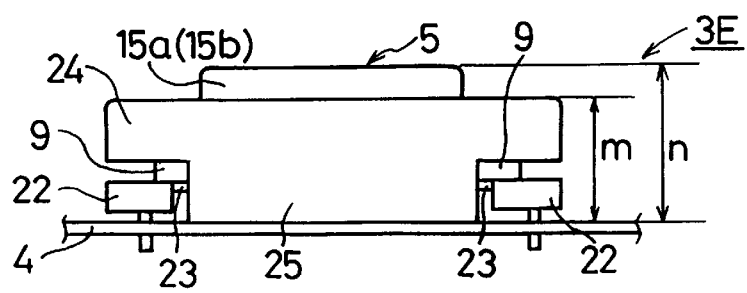
FIG. 5 is a perspective view along arrow G of FIG. 1.

In this magnetic head assembly 1E, as shown in FIGS. 1–3, a magnetic head mechanism 3E comprises a magnetic head 5 accommodated in a shield ring 6 in such a manner as the spacing A between the upper side 24a of the shield ring 6 and the center C of the groove 14 becomes identical to the spacing B (A=B) between the below side 24b of the shield ring 6 and the center C of the groove 14. That is, a gap between the upper side 24a of the shield ring 6 and the coil 9 is reduced, on the other hand, a gap between the lower side 24b of the shield ring 6 and a connecting portion 13 of a magnetic head stand 7 is set appropriately. As to other parts of the magnetic head mechanism 3E, as shown in FIGS. 1–3, 4 and 5, those are formed identically with those of the magnetic head mechanism 3 shown in FIGS. 8–11.

Figure 6:
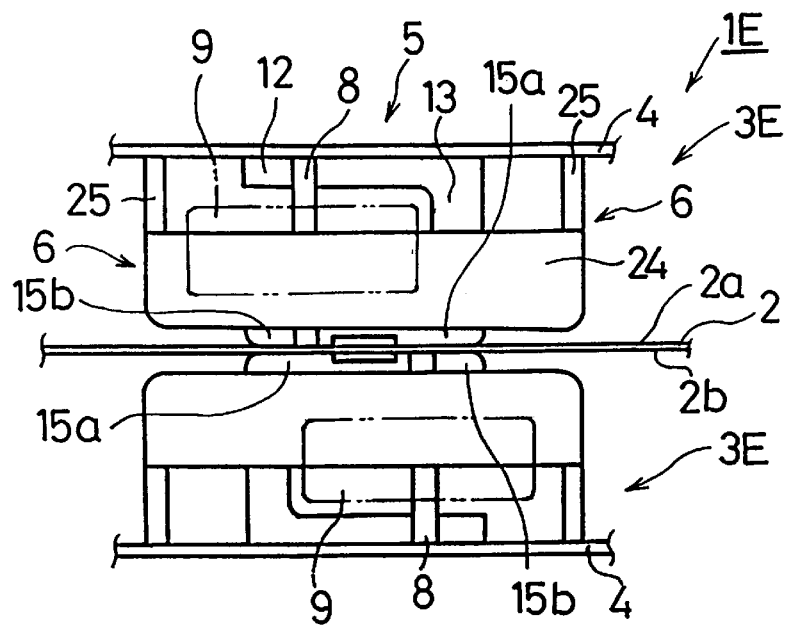
FIG. 6 shows assembling status of the magnetic head assembly of FIG. 1.

And, as shown in FIG. 6, this magnetic head 1E is constituted in such a manner as the magnetic head mechanisms 3E,3E are disposed between which the magnetic recording medium 2 is sandwiched. In this case, the magnetic head assembly 1E is constituted, wherein a pair of magnetic head mechanisms 3E,3E are disposed in such a manner as the proximal end rail 15a and the distal end rail 15b of one magnetic head mechanism 3E are opposing completely to the distal end rail 15b and the proximal end rail 15a, respectively.

Figure 7:
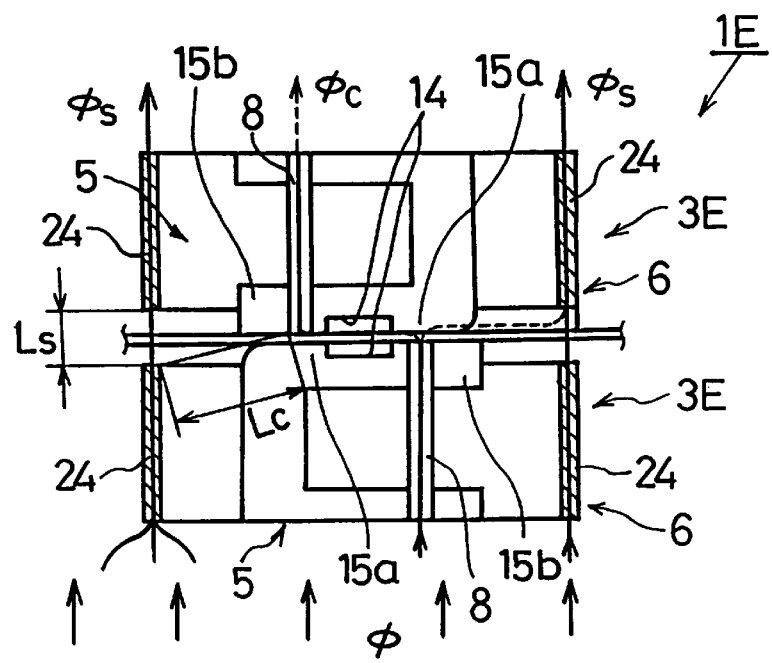
FIG. 7 shows a function of one embodiment of FIG. 1.
Figure 8:
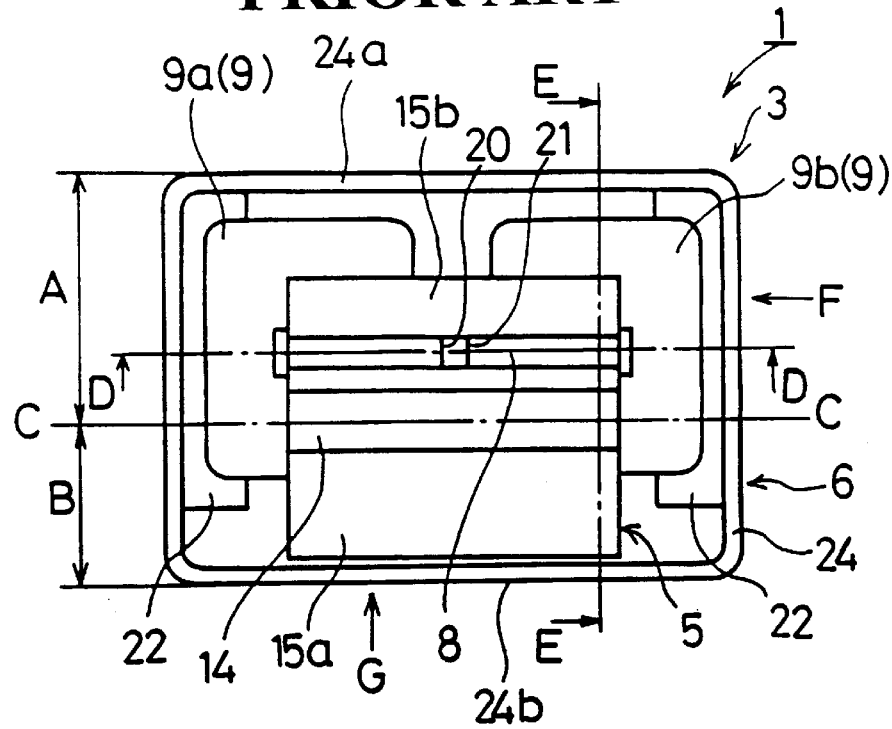
FIG. 8 shows a plan view of one side of magnetic head and one shield ring of a conventional magnetic head assembly.
Figure 9:
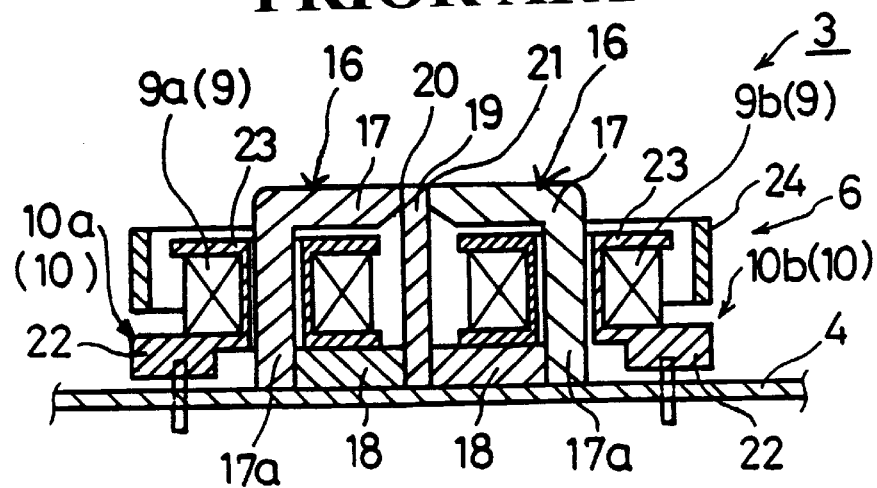
FIG. 9 is a sectional view along arrow D—D of FIG. 8.
Figure 10:
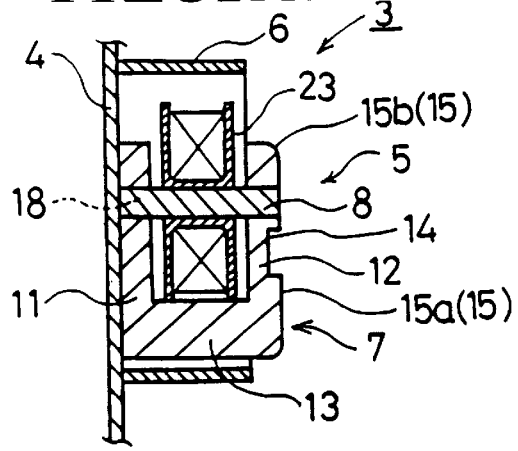
FIG. 10 is a sectional view along arrow E—E of FIG. 8.
Figure 11:
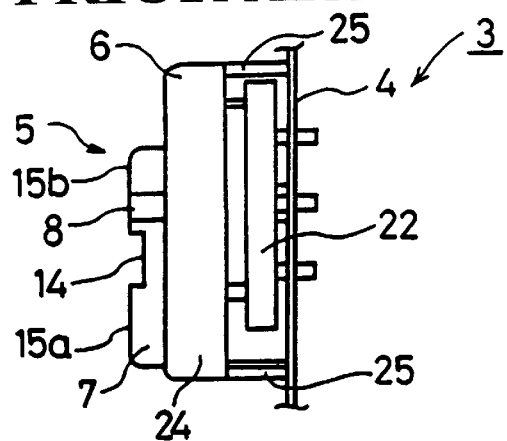
FIG. 11 is a perspective view along arrow F of FIG. 8.
Figure 12:
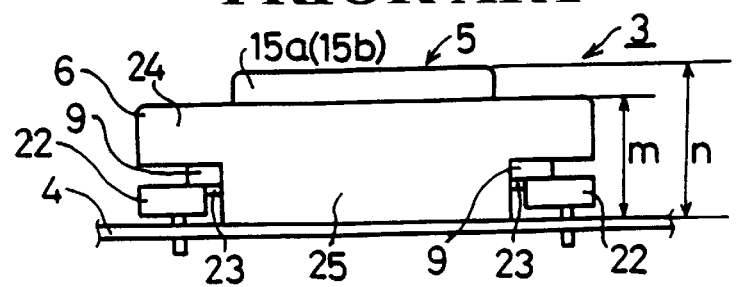
FIG. 12 is a perspective view along arrow G of FIG. 8.
Figure 13:
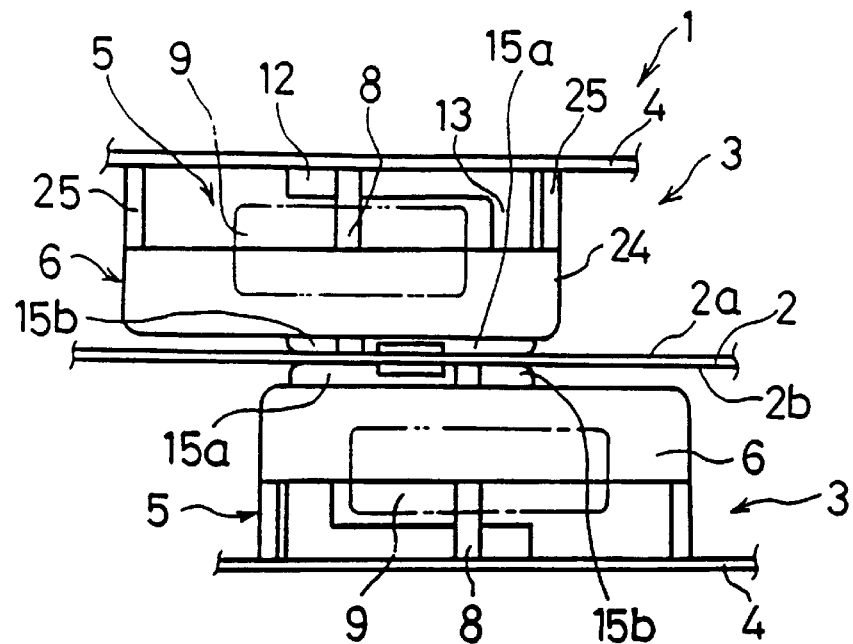
FIG. 13 shows assembling status of the magnetic head assembly of FIG. 8.
Figure 14:
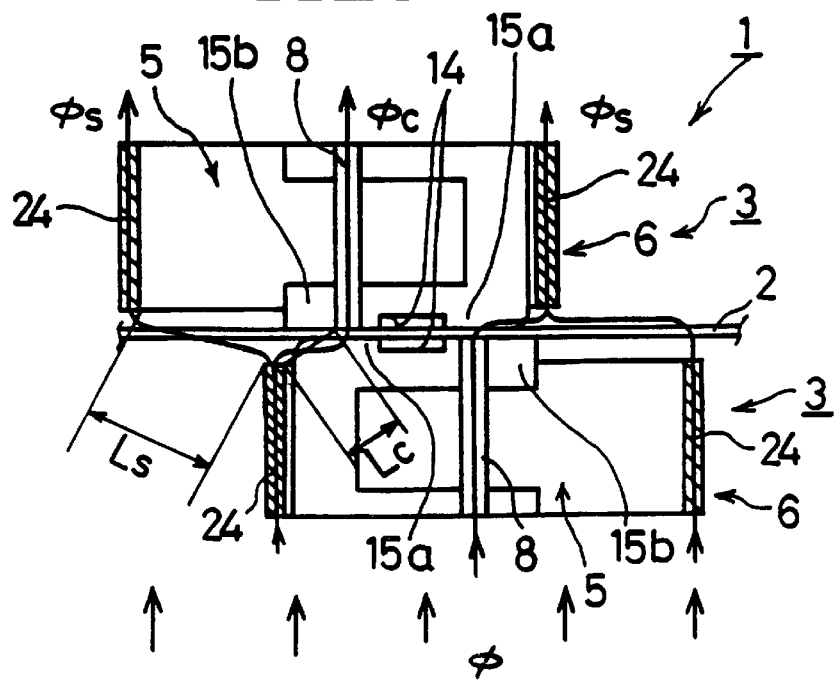
FIG. 14 shows a function of one conventional magnetic head assembly.

In the magnetic head assembly 1E thus formed, the magnetic head mechanisms 3E comprises the magnetic head 5 accommodated in the shield ring 6 in such a manner as the spacing A between the upper side 24a of the shield ring 6 and the center C of the groove 14 becomes identical to the spacing B (A=B) between the below side 24b of the shield ring 6 and the center C of the groove 14, and since thus formed pair of magnetic head mechanisms 3E,3E are disposed in such a manner as the proximal end rail 15a and the distal end rail 15b of one magnetic head mechanism 3E are opposing completely to the distal end rail 15b and the proximal end rail 15a, respectively, a pair of shield rings 6 are, as shown in FIGS. 6 and 7, opposing completely (without any off-set). FIG. 6 shows that the sides of each of the shield rings are vertically aligned.

Therefore, the spacing, or minimum distance, $L_s$ between the both shield rings 6,6 (in this embodiment, ones are at upper side and below side in FIG. 6, respectively) becomes shorter than the spacing $L_c$ between the one shield ring 6 and the other magnetic head core 8, so that the outside flux $\phi$ received by the one shield ring 6 becomes the flux $\phi_s$ to flow to the other shield ring 6, and the flux $\phi_c$ to flow to the other magnetic head core 8 becomes relatively small, which causes to control the induced voltage generated in the read/write coil 9a to decrease the noise generated.

In the above embodiment, the magnetic head mechanism 3E is constituted in such a manner as the upper side 24a of the shield ring 6 and the center C of the groove 14 becomes approximately identical to the spacing B (A=B) between the below side 24b of the shield ring 6 and the center C of the groove 14, however, the present invention is not limited to this constitution, and it may be disposed in such a manner that the spacing A is approximately identical to the spacing B between the lower side 24b and the center C of the groove 14, and the spacing everywhere between two shield rings 6 is shorter than the spacing between the one shield ring 6 and the core of the other magnetic head 5.

In the invention, both of the shield ring are disposed completely opposite, in which the magnetic recording medium is sandwiched therebetween, and by setting the spacing thereof everywhere shorter than the spacing between the one shield ring and the other magnetic head core, the most part of the outer flux flows easily to other shield ring to cause the flux flown to the other magnetic head core relatively to be reduced, thereby the induced voltage generated in the read/write coil by any external magnetic field can be controlled and eventually the noise generated can be reduced.

In the invention, both of the shield ring are disposed completely opposite, in which the magnetic recording medium is sandwiched therebetween, and by setting the spacing thereof everywhere shorter than the spacing between the one shield ring and the other magnetic head core, the most part of the outer flux flows easily to other shield ring to cause the flux flown to the other magnetic head core relatively to be reduced, thereby the induced voltage generated in the read/write coil by any external magnetic field can be controlled and eventually the noise generated can be reduced.

What is claimed is:

1. A magnetic head assembly comprising:
   a pair of magnetic heads disposed on opposite sides of a magnetic recording medium, each magnetic head including at least one rail and at least one coil wound around at least one respective core, each at least one core being provided on a same one of the at least one rail, and only one of said at least one rail being provided with said at least one core;
   a first shield ring surrounding an outer periphery of one of the magnetic heads to prevent an external magnetic field from entering the magnetic head; and
   a second shield ring surrounding an outer periphery of the other one of the magnetic heads to prevent an external magnetic field from entering the other one of the magnetic heads, wherein the first shield ring is positioned on one side of the recording medium and the second shield ring is positioned on the other side of the recording medium such that sides of the first shield ring are vertically aligned with corresponding sides of the second shield ring and a minimum distance between said first and second shield rings is shorter than a minimum distance between either said first shield ring or said second shield ring on one side of the recording medium and the core on the other side of the recording medium.

2. The magnetic head assembly of claim 1, wherein four sides of the first shield ring are positioned symmetrically with respect to four sides of the second shield ring.

3. A magnetic head assembly comprising:
   a pair of magnetic heads disposed on opposite sides of a magnetic recording medium, each magnetic head including at least one rail and at least one coil wound around at least one respective core, each at least one core being provided on a same one of the at least one rails, and only one of said at least one rail being provided with said at least one core;
   first shield ring means surrounding one of the magnetic heads for preventing an external magnetic field from entering the magnetic head; and
   second shield ring means surrounding the other one of the magnetic heads for preventing an external magnetic field from entering the other one of the magnetic heads, wherein the first shield ring means is positioned on one side of the recording medium and the second shield ring means is positioned on the other side of the recording medium such that sides of the first shield ring means are vertically aligned with corresponding sides of the second shield ring means and a minimum distance between said first and second shield ring means is shorter than a minimum distance between either said first shield ring means or said second shield ring means on one side of the recording medium and the core on the other side of the recording medium.

4. The magnetic head assembly of claim 3, wherein four sides of the first shield ring means are positioned symmetrically with respect to four sides of the second shield ring means.

* * * * *